United States Patent
Mujicic et al.

(10) Patent No.: US 10,344,353 B2
(45) Date of Patent: Jul. 9, 2019

(54) LEACH AID FOR METAL RECOVERY

(71) Applicant: Ecolab USA Inc., St. Paul, MN (US)

(72) Inventors: Vladimir Mujicic, Belgrade (RS); Kim Coleman, Elkhorn, WI (US); Kevin O'Brien, St. Charles, IL (US)

(73) Assignee: Ecolab USA Inc., St. Paul, MN (US)

( * ) Notice: Subject to any disclaimer, the term of this patent is extended or adjusted under 35 U.S.C. 154(b) by 185 days.

(21) Appl. No.: 15/093,422

(22) Filed: Apr. 7, 2016

(65) Prior Publication Data

US 2016/0298209 A1 Oct. 13, 2016

Related U.S. Application Data

(60) Provisional application No. 62/144,636, filed on Apr. 8, 2015.

(51) Int. Cl.
| | |
|---|---|
| *C22B 3/00* | (2006.01) |
| *C22B 3/04* | (2006.01) |
| *C22B 11/08* | (2006.01) |
| *C22B 15/00* | (2006.01) |
| *C22B 3/06* | (2006.01) |
| *C22B 3/08* | (2006.01) |
| *C22B 3/10* | (2006.01) |

(Continued)

(52) U.S. Cl.
CPC .............. *C22B 11/04* (2013.01); *C22B 3/04* (2013.01); *C22B 3/06* (2013.01); *C22B 3/065* (2013.01); *C22B 3/08* (2013.01); *C22B 3/10* (2013.01); *C22B 3/12* (2013.01); *C22B 3/14* (2013.01); *C22B 3/165* (2013.01); *C22B 3/1616* (2013.01); *C22B 11/08* (2013.01); *C22B 15/0067* (2013.01); *C22B 15/0076* (2013.01); *Y02P 10/234* (2015.11)

(58) Field of Classification Search
CPC .. C22B 3/04; C22B 3/06; C22B 3/065; C22B 15/0067–15/0076; C22B 11/04; B03D 1/02; B03D 1/004
See application file for complete search history.

(56) References Cited

U.S. PATENT DOCUMENTS

| | | | | |
|---|---|---|---|---|
| 2,073,492 A | * | 3/1937 | Ray | B03D 1/012 |
| | | | | 209/166 |
| 2,413,648 A | * | 12/1946 | Ott | C07F 9/02 |
| | | | | 252/61 |

(Continued)

FOREIGN PATENT DOCUMENTS

| | | | |
|---|---|---|---|
| CN | 103721851 A | 4/2014 | |
| GB | 1567765 | 5/1980 | |
| WO | WO-2016164600 A1 * | 10/2016 | ............. C22B 11/04 |

OTHER PUBLICATIONS

Kesler, Stephen E. et al. "Gold in Porphyry Copper Deposits: Its Abundance and Fate." Ore Geology Reviews, vol. 21 pp. 103-124. www.elsevier.com/locate/oregeorev. (Year: 2002).*

(Continued)

*Primary Examiner* — Tima M McGuthry-Banks
(74) *Attorney, Agent, or Firm* — Kagan Binder, PLLC

(57) ABSTRACT

Methods of recovering metals from metal-bearing materials, and more particularly, methods for improving leaching efficiency in extraction processes by employing a surfactant composition in the extraction process, as well as slurries useful in the methods of recovering metals are provided.

19 Claims, 3 Drawing Sheets

(51) Int. Cl.
*C22B 3/12* (2006.01)
*C22B 3/14* (2006.01)
*C22B 3/16* (2006.01)

(56) References Cited

U.S. PATENT DOCUMENTS

| | | | | |
|---|---|---|---|---|
| 2,446,207 | A * | 8/1948 | Bishop | B03D 1/012 |
| | | | | 209/166 |
| 2,539,823 | A * | 1/1951 | Furman | C01G 45/00 |
| | | | | 423/50 |
| 2,716,600 | A * | 8/1955 | Frick | C22B 15/0063 |
| | | | | 209/164 |
| 2,730,493 | A * | 1/1956 | Carlson | C22B 15/0063 |
| | | | | 205/584 |
| 2,731,327 | A * | 1/1956 | Anderson | C22B 34/1204 |
| | | | | 209/166 |
| 3,761,566 | A * | 9/1973 | Michal | C22B 23/043 |
| | | | | 423/141 |
| 3,837,489 | A * | 9/1974 | Michalski | B01D 19/0404 |
| | | | | 209/167 |
| 3,884,831 | A * | 5/1975 | Bloom | C22B 3/00 |
| | | | | 423/109 |
| 4,187,281 | A | 2/1980 | Stauter | |
| 4,417,992 | A | 11/1983 | Bhattacharyya et al. | |
| 4,551,261 | A | 11/1985 | Salihar | |
| 4,561,905 | A | 12/1985 | Kittle | |
| 4,715,962 | A | 12/1987 | Bhattacharyya et al. | |
| 4,898,611 | A | 2/1990 | Gross | |
| 4,971,720 | A | 11/1990 | Roe | |
| 5,100,631 | A | 3/1992 | Gross | |
| 5,147,618 | A | 9/1992 | Touro et al. | |
| 5,171,427 | A * | 12/1992 | Klimpel | B03D 1/012 |
| | | | | 162/5 |
| 5,181,957 | A | 1/1993 | Gross et al. | |
| 5,196,052 | A | 3/1993 | Gross et al. | |
| 5,205,858 | A * | 4/1993 | Manke | C22B 11/08 |
| | | | | 75/426 |
| 5,215,575 | A | 6/1993 | Butler | |
| 5,215,784 | A | 6/1993 | Tippett et al. | |
| 5,330,671 | A | 7/1994 | Pullen et al. | |
| 5,527,482 | A | 6/1996 | Pullen et al. | |
| 5,827,348 | A | 10/1998 | Waddell et al. | |
| 5,833,937 | A | 11/1998 | Kerr | |
| 5,863,456 | A | 1/1999 | Pullen | |
| 5,876,622 | A | 3/1999 | Pullen et al. | |
| 5,958,287 | A | 9/1999 | Pullen et al. | |
| 6,124,366 | A | 9/2000 | Pullen et al. | |
| 6,365,116 | B1 | 4/2002 | Barham et al. | |
| 6,423,117 | B1 | 7/2002 | Robinson | |
| 7,398,935 | B2 | 7/2008 | Tran et al. | |
| 7,517,384 | B2 | 4/2009 | Marsden et al. | |
| 7,736,487 | B2 | 6/2010 | Marsden et al. | |
| 7,871,454 | B2 | 1/2011 | dos Santos | |
| 8,062,614 | B2 | 11/2011 | Kordosky et al. | |
| 2002/0190005 | A1 * | 12/2002 | Branning | B01F 17/0021 |
| | | | | 210/702 |
| 2003/0192403 | A1 * | 10/2003 | Burgmayer | C22B 3/04 |
| | | | | 75/743 |
| 2006/0000783 | A1 | 1/2006 | Branning et al. | |
| 2006/0088458 | A1 | 4/2006 | Kordosky et al. | |
| 2007/0209481 | A1 | 9/2007 | Pereira et al. | |
| 2008/0196546 | A1 * | 8/2008 | Seelnnann-Eggebert | |
| | | | | C22B 3/08 |
| | | | | 75/300 |
| 2009/0241735 | A1 | 10/2009 | Abe et al. | |
| 2009/0272227 | A1 | 11/2009 | Creasey et al. | |
| 2010/0021370 | A1 * | 1/2010 | Nagaraj | B03D 1/016 |
| | | | | 423/561.1 |
| 2010/0090160 | A1 | 4/2010 | Branning | |
| 2010/0282025 | A1 | 11/2010 | Nisbett | |
| 2011/0259148 | A1 | 10/2011 | Young et al. | |
| 2012/0128528 | A1 | 5/2012 | Langhans, Jr. et al. | |
| 2012/0145605 | A1 * | 6/2012 | Greene | B03D 1/008 |
| | | | | 209/166 |
| 2012/0227545 | A1 | 9/2012 | Padayachee et al. | |
| 2012/0247271 | A1 | 10/2012 | Halpin et al. | |
| 2012/0328494 | A1 | 12/2012 | Dreisinger et al. | |
| 2013/0256589 | A1 | 10/2013 | Branning | |
| 2014/0348728 | A1 | 11/2014 | Richardson et al. | |

OTHER PUBLICATIONS

Sun, Jidong, PhD. "D-Limonene: Safety and Clinical Applications." Alternative Medicine Reveiw, vol. 12, No. 3 pp. 259-264 (Year: 2007).*
Coleman et al. Derwent ACC No. 2016-64019S for the patent family including US 20160298209 and WO 2016164600. (Year: 2016).*
Salager, Jean-Louis. FIRP Booklet #E300-A, Teaching AID in Surfactant Science & Engineering in English "Surfactants Types and Uses", Laboratory of Formulation, Interfaces Rheology and Processes (2002), version 2, 50 pages.
Jean-Louis Salager, "Surfactants Types and Uses," FIRP Booklet #E300-A, Version 2, (2002) 50 pages.
International Search Report dated Jul. 18, 2016 for International Application No. PCT/US2016/026474, 4 pages.
Written Opinion dated Jul. 18, 2016 for International Application No. PCT/US2016/026474, 5 pages.
European Search Report in Application No. 16777289.6, dated Sep. 26, 2018, 8 pages.
Niu et al., "Reductive leaching of manganese from manganese anode slag", The Chinese Journal of Nonferrous Metals, vol. 22, No. 9, Aug. 31, 2012, pp. 2662-2666, retrieved on Sep. 13, 2018 from the EPO Munich library, (English Abstract Enclosed).
University Chemistry Handbook, edited by Zhang Yanhao, Shanghai Jiaotong University Press, May 31, 2000, pp. 104-107 (No English Translation).

* cited by examiner

LEACH AID FOR METAL RECOVERY

TECHNICAL FIELD

The present disclosure relates to compositions and processes for recovering metal values from metal-bearing materials, e.g., ores, concentrates, and other metal-bearing materials.

BACKGROUND

One approach to separating metals from metal-bearing materials includes subjecting the ground or crushed material to treatment with a chemical solution containing one or more reagents capable of selectively solubilizing the desired metal constituents while leaving the remainder of the metal-bearing material behind. The leach solution may then be treated in further recovery and refining operations to obtain the metal values in a purified form. Despite available technologies, there is a need in the art for improved methods of recovering metal values from metal-bearing materials.

SUMMARY

A method of extracting metal from a metal-bearing material is provided. The method comprises forming a slurry comprising the metal-bearing material, water, a surfactant composition, and a leaching composition. At least a portion of the metal from the slurry is recovered.

A method of improving leaching efficiency in a metal extraction process is provided. The method comprises treating a metal-bearing material with a surfactant composition. The treated metal-bearing material is subjected to a metal extraction process.

A slurry is provided. The slurry comprises water; a metal-bearing material comprising at least one of gold, silver, and copper; a high terpene-containing natural oil; and a leaching agent comprising at least one of an acid and a cyanide.

The metal-bearing material may be comminuted prior to formation of the slurry. The metal-bearing material may be treated with the surfactant composition prior to, during, or after comminution. The comminuted metal-bearing material may be formulated as an aqueous slurry including the comminuted metal-bearing material.

The surfactant composition may include an anionic surfactant selected from the group consisting of an alkyl aryl sulfonate, an olefin sulfonate, a paraffin sulfonate, an alcohol sulfate, an alcohol ether sulfate, an alkyl carboxylate, an alkyl ether carboxylate, an ethoxylated alkyl phosphate ester, a monoalkyl sulfosuccinate, a dialkyl sulfosuccinate, a monoalkyl sulfosuccinamate, a dialkyl sulfosuccinamate, and combinations thereof.

The surfactant composition may include a cationic surfactant selected from the group consisting of an alkyl trimethyl quaternary ammonium salt, an alkyl dimethyl benzyl quaternary ammonium salt, a dialkyl dimethyl quaternary ammonium salt, an imidazolinium salt, and combinations thereof.

The surfactant composition may include a nonionic surfactant selected from the group consisting of an alcohol alkoxylate, an alkylphenol alkoxylate, a block copolymer of ethylene oxide, a block copolymer of propylene oxide, and a block copolymer of butylene oxide, an alkyl dimethyl amine oxide, an alkyl-bis(2-hydroxyethyl)amine oxide, an alkyl amidopropyl dimethyl amine oxide, an alkylamidopropyl-bis(2-hydroxyethyl)amine oxide, an alkyl polyglucoside, a polyalkoxylated glyceride, a sorbitan ester, a polyalkoxylated sorbitan ester, an alkoyl polyethylene glycol ester, an alkoyl polyethylene glycol diester, multiples thereof, and combinations thereof.

The surfactant composition may include a high terpene-containing natural oil.

The surfactant composition may be present in the slurry at a concentration of from about 1 gram of surfactant composition to about 10,000 grams of surfactant composition per metric ton of metal-bearing material. The surfactant composition may be present in the slurry at a concentration of from about 10 grams of surfactant composition to about 100 grams of surfactant composition per metric ton of metal-bearing material.

The leaching composition may include a leaching agent selected from the group consisting of nitric acid, hydrofluoric acid, hydrochloric acid, sulfuric acid, phosphoric acid, perchloric acid, a carbonate, a hydroxide base, gaseous ammonia, a cyanide salt, ferric sulfate, ferric chloride, cupric chloride, ferrous chloride, ozone, a thiosulfate salt, thiourea, thiosulfuric acid, dithiooxamide, a substituted dithiooxamide, a halogen-containing compound, and combinations thereof. The leaching agent may be at least one of sodium cyanide, potassium cyanide, and calcium cyanide.

The recovered metal may be gold, silver, platinum, palladium, titanium, or nickel.

The metal-bearing material may be ore.

The metal-bearing material may be treated with the leaching composition in a stirred reactor.

In another aspect, disclosed is a method of improving leaching efficiency in a metal extraction process, the method including treating a metal-bearing material with a surfactant composition; and subjecting the treated metal-bearing material to a metal extraction process. The metal-bearing material may be comminuted before or during treatment with the surfactant composition. The extraction process may include at least one of in-situ leaching, dump leaching, heap leaching, vat leaching, agitated leaching, and combinations thereof.

The compositions, methods, and processes are further described herein.

DETAILED DESCRIPTION

Figure 1:
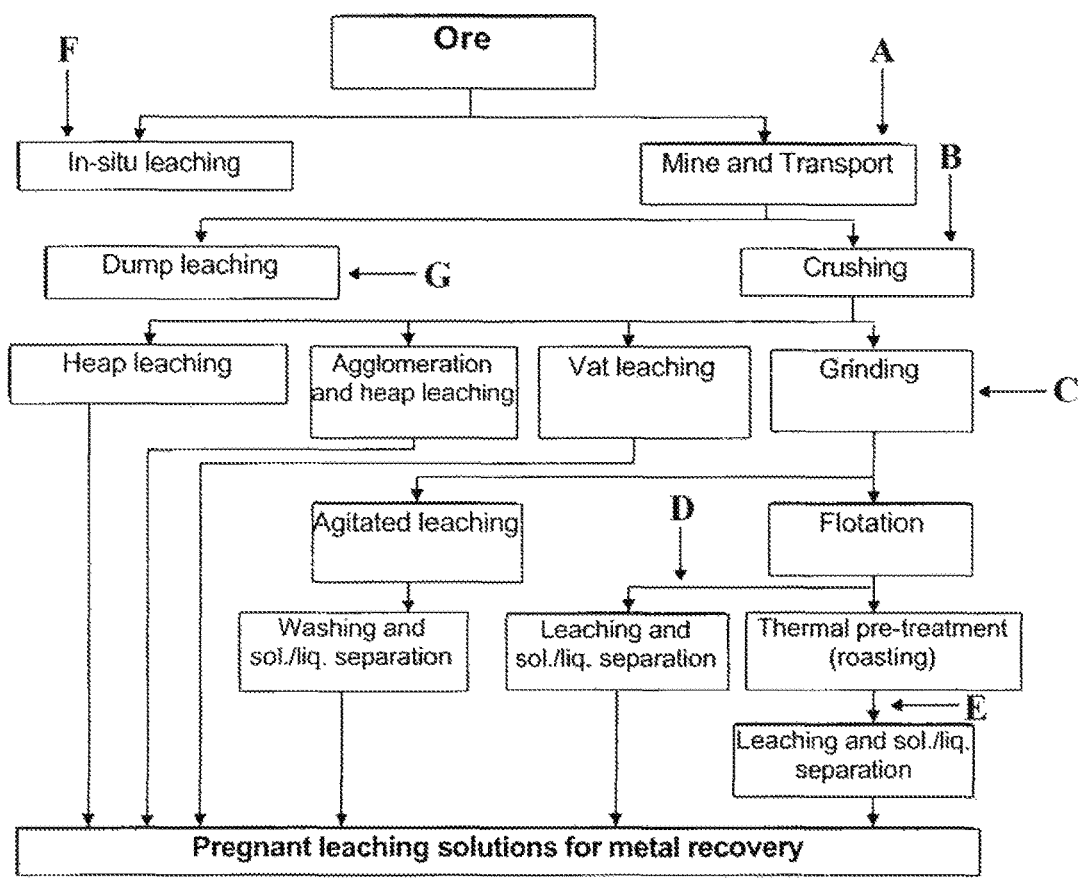
FIG. 1 is a flow diagram depicting an exemplary process of leaching metal from a metal-bearing material.

Disclosed are methods of improving extraction of metal from a metal-bearing material. The methods include treating a metal-bearing material with a surfactant composition, and leaching a metal from the treated metal-bearing material. The metal-bearing material may be treated with the surfactant composition at any suitable point in the extraction process. In certain embodiments, the surfactant composition improves leaching of metal from metal-bearing material. While not wishing to be bound by theory, it is believed that the surfactant composition reduces surface tension of leaching agent solutions at particle surfaces of the metal-bearing material. The reduced surface tension is believed to allow for increased exposure of metal-bearing particle surfaces to the leaching agents added during the extraction process, which in turn is believed to allow for greater dissolution and/or chemical reaction of the metal with the leaching agent(s).

The methods provide several advantages over current technologies. In particular, the methods can improve leaching efficiency and metal recovery from metal-bearing materials. The methods can be implemented into current extraction processes with minimal capital investment, using equipment already in place.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used in the specification and the appended claims, the singular forms "a," "an" and "the" include plural references unless the context clearly dictates otherwise. The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

As used herein, the term "agglomeration" refers to a process where small particles, such as fines, combine into larger masses or clumps, or combine together with larger particles.

As used herein, the term "flotation" refers to a process for concentrating minerals from their ores. In a flotation process, the ore may be crushed and wet ground to obtain a pulp. Additives such as flotation or collecting agents and frothing agents may be added to the pulp to assist in subsequent flotation steps in separating valuable minerals from the undesired, or gangue, portion of the ore. The flotation or collecting agents can comprise liquids such as oil, other organic compounds, or aqueous solutions. Flotation may be accomplished by aerating the pulp to produce froth at the surface. Minerals, which adhere to the bubbles or froth, can be skimmed or otherwise removed and the mineral-bearing froth collected and further processed to obtain the desired minerals.

As used herein, the term "pregnant solution" refers to a solution carrying a dissolved metal, mineral, and/or a desired solute. A pregnant solution may carry residual leaching agents, and/or other materials. The pregnant solution may carry soluble ions or metallic complexes. The pregnant solution may be unsaturated in a desired solute, or may be liquor saturated in desired solute.

As used herein, the term "barren solution" refers to leaching solution that has been previously used within a leach process (e.g., was once a pregnant leach solution) and has been processed or otherwise sufficiently reconstituted (e.g., recycled).

As used herein, the term "metal value" may refer to a metal component or components targeted for recovery from a metal-bearing material (e.g., a mineral ore).

Disclosed are methods of improving leaching efficiency from metal-bearing material in extractive metallurgy processes. The methods include treating the metal-bearing material (e.g., an ore material) with a surfactant composition. The metal-bearing material may be treated with the surfactant composition at any suitable point in an extraction process, preferably before and/or during treatment with a leaching composition. The surfactant composition can be added to a raw metal-bearing material (e.g., raw ore material), a crushed metal-bearing material, a ground/milled metal-bearing material, and/or a slurry of metal-bearing material. The surfactant composition can be applied to a metal-bearing material during pre-leaching processes (e.g., during transport, during crushing, grinding, mixing, or during blending into a slurry). The surfactant composition can be combined with one or more compositions, before or during application to a metal-bearing material. The surfactant composition can be combined with a leaching composition and applied concurrently to a metal-bearing material.

In certain embodiments, the methods include treating a raw ore material with a surfactant composition, comminuting the treated ore material (e.g., wet or dry crushing and/or wet or dry grinding), and leaching one or more selected metals from the comminuted, treated ore material. In certain embodiments, the methods include treating a comminuted ore material with a surfactant composition, and leaching one or more selected metals from the comminuted, treated ore material. In certain embodiments, the methods include treating a slurry of comminuted ore material with a surfactant composition, and leaching one or more selected metals from the treated slurry of ore material. In certain embodiments, the methods include treating a comminuted ore material with a composition including a surfactant composition and a leaching composition, and leaching one or more selected metals from the comminuted, treated ore material.

An exemplary process of the present disclosure may include: comminuting a metal-bearing material; treating the comminuted material with an effective amount of a surfactant composition; and adding an effective amount of a leaching composition to the treated, comminuted material. The process may include mixing the comminuted material (before, during, and/or after treatment with the surfactant composition) with water to produce a slurry. The process may include adding an effective amount of a leaching composition to the slurry (before, during, and/or after treatment with the surfactant composition.)

FIG. 1 is a flow chart depicting an exemplary extraction process and optional points of addition of surfactant composition in the exemplary process. As shown, a surfactant composition may be delivered to a raw ore material (addition point A). The treated raw ore material may be subjected to a leaching process thereafter, such as dump leaching, heap leaching, vat leaching, or agitated leaching, as discussed below. A surfactant composition may be delivered to an ore material prior to, during, and/or immediately after a crushing phase (addition point B). The treated, crushed ore material may be subjected to a leaching process thereafter, such as heap leaching, vat leaching, or agitated leaching. A surfactant composition may be delivered to an ore material prior to, during, and/or immediately after a grinding phase (addition point C). The treated, ground ore material may be subjected to a leaching process thereafter, such as vat leaching or agitated leaching. A surfactant composition may be delivered to an ore material after a flotation phase (addition point D). The treated ore material may be subjected to a leaching process thereafter, such as vat leaching or agitated leaching. A surfactant composition may be delivered to an ore material after a thermal pre-treatment phase (addition point E). The treated ore material may be subjected to a leaching process thereafter, such as vat leaching or agitated leaching. A surfactant composition may be delivered to an ore material prior to and/or during an in-situ leaching process (addition point F). A surfactant composition may be delivered to an ore material prior to and/or during a dump leaching process (addition point G).

Figure 2:
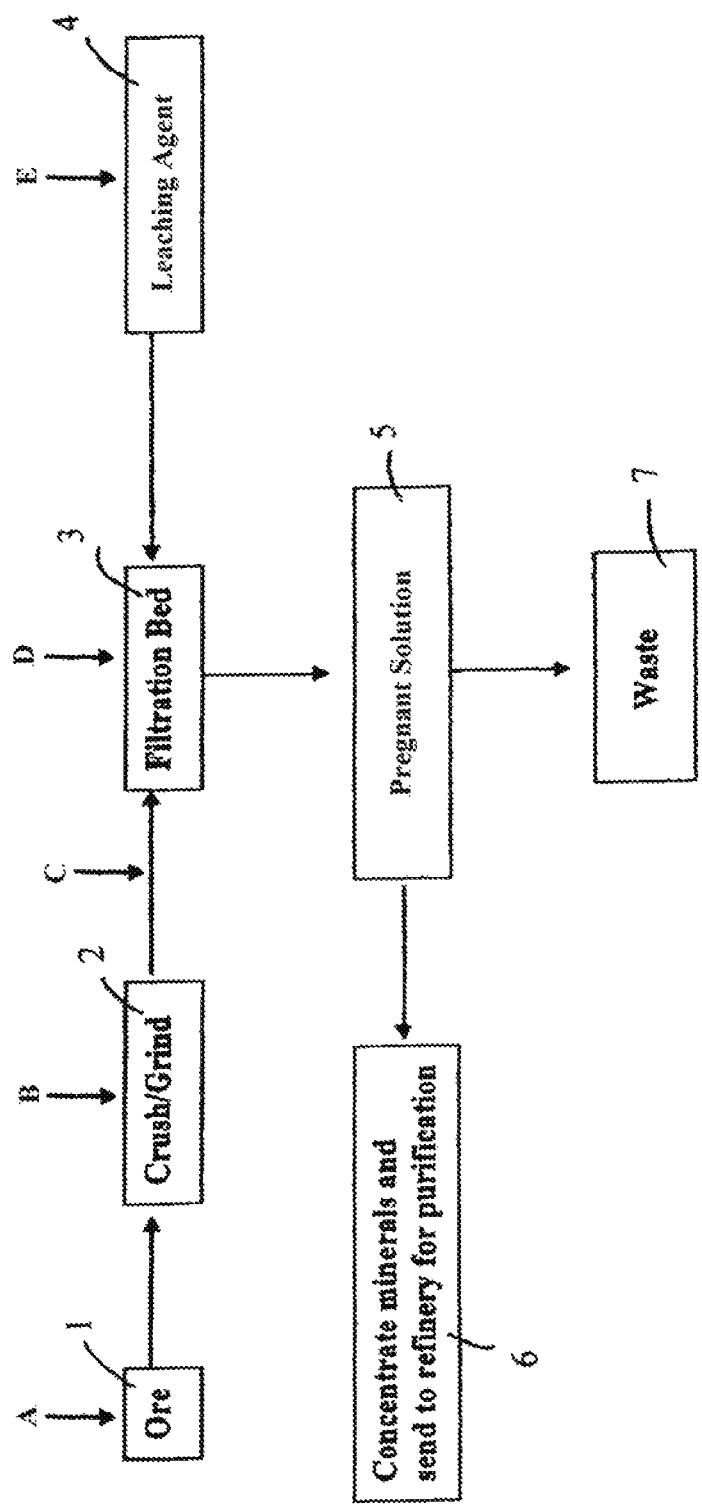
FIG. 2 is a flow diagram depicting an exemplary process of recovering metal from a metal-bearing material.

FIG. 2 is a flow chart depicting another exemplary process implementing the disclosed methods. An ore material 1 can be conveyed to a grinder 2 (e.g., a ball mill) and crushed and/or ground (e.g., wet or dry crushing and/or wet or dry grinding). The ore material may be crushed and/or ground to any selected particle size (e.g., 100%—65 Tyler mesh, or 100%—100 Tyler mesh). The crushed and/or ground ore material may be treated with a solution (e.g., an aqueous solution) to produce an ore slurry during and/or after the comminution process. The slurry may have any selected solids content (e.g., between 35% and 55%, or between 40% and 50% by weight). The comminuted ore material may be conveyed to a fixed bed 3 (e.g., an impermeable plastic and/or clay lined leach pad). The ore on the fixed bed 3 may be treated with a leaching composition 4 (e.g., an aqueous solution of cyanides, thiourea, or thiosulfuric acid). The leaching composition may percolate through the ore material and extract one or more selected minerals (e.g., gold, silver, platinum, indium, gallium, lead, zinc, copper, nickel, uranium) from the ore to provide a pregnant solution 5. The pregnant solution 5 may be processed to remove waste materials 7 and thereafter concentrated and refined 6 for purification of the metal(s). Waste 7 may be processed as appropriate.

As shown in FIG. 2, a surfactant composition may be delivered to the raw ore material at one or more points in the extraction process. The surfactant composition may be delivered to a raw ore material before comminution (addition point A); the surfactant composition may be delivered to the ore material during comminution (addition point B); the surfactant composition may be delivered to the ore material after comminution (addition point C) and before delivery to the fixed bed 3; the surfactant composition may be delivered to the ore material on the fixed bed 3 (addition point D), and throughout the leaching process as desired; and/or the surfactant composition may be mixed with the leaching composition (addition point E) and delivered simultaneously to the ore material along with the leaching composition. The surfactant composition may be delivered, for example, via mechanical conveyance, dilute or dense phase conveyance, or pneumatic conveyance. The surfactant composition may be provided in a controlled manner using a volumetric or gravimetric feeder, for example.

Figure 3:
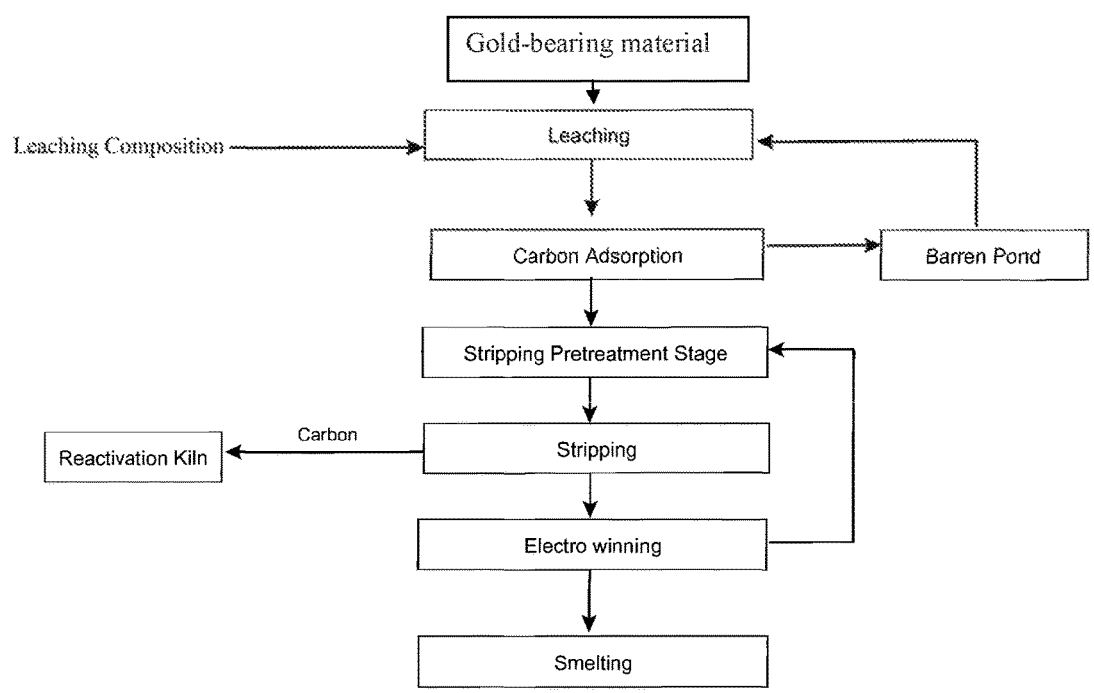
FIG. 3 is a flow diagram depicting an exemplary process of recovering gold from a gold-bearing material.

FIG. 3 is a flow chart depicting another exemplary process implementing the disclosed methods, wherein the process includes a cyanide leaching system used for gold extraction. A metal-bearing material may be treated with a leaching composition. Activated carbon may then be used to adsorb desired metals from the pregnant leach solution, and free leach agent may be sent back to the leaching process through a barren pond. Bound metals may be stripped from the carbon, and the carbon may be reactivated in a kiln for further use. The stripped metals may be isolated from solution by electrowinning and smelting.

The disclosed methods may provide metal recovery rates of about 80% to 100%, about 85% to 100%, about 90% to 100%, or about 95% to 100% recovery from metal-bearing materials. The disclosed methods may provide metal recovery rates of about 80% or greater, about 81% or greater, about 82% or greater, about 83% or greater, about 84% or greater, about 85% or greater, about 86% or greater, about 87% or greater, about 88% or greater, about 89% or greater, about 90% or greater, about 91% or greater, about 92% or greater, about 93% or greater, about 94% or greater, about 95% or greater, about 96% or greater, about 97% or greater, about 98% or greater, about 99% or greater, or 100%.

The disclosed methods may provide an improvement in leaching efficiency when compared to a control (0 ppm of surfactant composition), of about 0.5% to about 1%, about 0.5% to about 1.5%, about 0.5% to about 2%, about 0.5% to about 5%, about 0.6% to about 1%, about 0.7% to about 1%, about 0.8% to about 1%, about 0.9% to about 1%, or about 1%. The disclosed methods may provide an improvement in leaching efficiency when compared to a control (0 ppm of surfactant composition), of about 0.5% or greater, about 0.6% or greater, about 0.7% or greater, about 0.8% or greater, about 0.9% or greater, or about 1% or greater.

The disclosed methods employ at least one surfactant composition. The surfactant composition includes one or more compounds that improve leaching efficiency in extraction processes. While not wishing to be bound by theory, the surfactant composition is believed to improve leaching from metal-bearing materials (e.g., mineral ores) by reducing surface tension of the leaching solution at particle surfaces. The reduced surface tension is believed to increase wetting of particle surfaces with the leaching composition, leading to improved extraction of metal.

Surfactant compounds suitable for inclusion in the surfactant compositions include, but are not limited to, anionic surfactants, cationic surfactants, zwitterionic surfactants, nonionic surfactants, and combinations thereof. Anionic surfactants include alkyl aryl sulfonates, sulfonates, paraffin sulfonates, alcohol sulfates, alcohol ether sulfates, alkyl carboxylates and alkyl ether carboxylates, alkyl and ethoxylated alkyl phosphate esters, and mono and dialkyl sulfosuccinates and sulfosuccinamates. Cationic surfactants include, but are not limited to, alkyl trimethyl quaternary ammonium salts, alkyl dimethyl benzyl quaternary ammonium salts, dialkyl dimethyl quaternary ammonium salts, and imidazolinium salts. Nonionic surfactants include, but are not limited to, alcohol alkoxylates, alkylphenol alkoxylates, block copolymers of ethylene, propylene and butylene oxides, alkyl dimethyl amine oxides, alkyl-bis(2-hydroxyethyl)amine oxides, alkyl amidopropyl dimethyl amine oxides, alkylamidopropyl-bis(2-hydroxyethyl)amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodiproprionate. A preferred surfactant compound suitable for inclusion in the surfactant composition comprises at least one of $C_{14-16}$ alpha olefin sulfonate and sodium dodecyl benzene sulfonate.

In certain embodiments of the inventive methods, the surfactant compositions include at least one of a quaternary ammonium compound, an amine oxide, an ionic or nonionic surfactant, and combinations thereof. Suitable quaternary ammonium compounds include, but are not limited to, alkyl benzyl ammonium salt; benzyl cocoalkyl($C_{12}$-$C_{18}$) dimethylammonium salt; dicocoalkyl ($C_{12}$-$C_{18}$)dimethylammonium salt; ditallow dimethylammonium salt; di(hydrogenated tallow alkyl)dimethyl quaternary ammonium methyl salt; methyl bis(2-hydroxyethyl cocoalkyl($C_{12}$-$C_{18}$) quaternary ammonium salt; dimethyl(2-ethyl)tallow ammonium methyl salt; n-dodecylbenzyldimethylammonium salt; n-octadecylbenzyldimethyl ammonium salt; n-dodecyltrimethylammonium salt; soya alkyltrimethylammonium salt; and hydrogenated tallow alkyl (2-ethylhyexyl)dimethyl quaternary ammonium methyl salt. Preferred salts of the aforementioned compounds are chlorides and/or sulfates.

Water soluble non-ionic monomers include, but are not limited to, acrylamide, N-substituted derivatives of acrylamide, hydroxyalkyl acrylates, and hydroxyalkyl methacrylates. Anionic monomers include, but are not limited to, salts of acrylic acid, methacrylic acid, ethacrylic acid, α-chloroacrylic acid, crotonic acid, itaconic acid, maleic acid, fumaric acid, vinyl sulfonic acid, and 2-acrylamido-2-methyl propane sulfonic acid. Cationic monomers include, but are not limited to, quaternary salts of dialkyl amino ethyl methacrylate, diallyl dimethyl ammonium chloride, vinyl benzyl-trimethyl ammonium chloride and the like. In certain embodiments, the nonionic monomers in the swellable polymer are selected from the group consisting of: acrylamide, N—N-dimethylacrylamide, 2-hydroxyethyl methacrylate, and combinations thereof.

In certain embodiments, the anionic monomers in the swellable polymer is an alkali (e.g., sodium) salt of a compound selected from the group consisting of: acrylic acid, methacrylic acid, 2-acrylamido-2-methyl propane sulfonic acid, and combinations thereof. In certain embodiments, the cationic monomer in the swellable polymer is diallyl dimethyl ammonium chloride. The water swellable cross-linked polymer can be synthesized with compounds having two ethylenic groups copolymerizable with water soluble monomers. Exemplary cross-linkers include N—N'-methylene-bis-acrylamide, N,N'-methylene-bis-methacrylamide, an alkylidene-bis-acrylamide, divinyl benzene sulfonate, ethylene glycol diacrylate, ethylene glycol dimethacrylate, diallyl ethylene glycol ether, divinyl ester of polyethylene glycol (e.g., polyethylene glycol-600 diacrylate), divinyl ether of polyethylene glycol and the like difunctional monomers.

In certain embodiments, the surfactant composition includes a nonionic surfactant. In certain embodiments, the nonionic surfactant is a coco-n-alcohol amine or amide, which in certain embodiments is cocodiethanolamide.

In certain embodiments, at least one of the water soluble brancher and the cross-linking agent is an adduct of glycerine and allyl glycidyl ether referred to herein as "B-brancher." Other types of branchers include the adducts of allylamine and a copolymer of maleic anhydride and methyl vinyl ether having differing mole ratios of allylamine to anhydrides, referred to herein as "A-branchers."

In certain embodiments, the surfactant compositions includes a homopolymer or copolymer of diallyldimethyl ammonium chloride ("DADMAC"), such as described in U.S. Pat. No. 4,561,905, which is incorporated herein by reference in its entirety. The copolymers may contain from about 5 mole percent to about 30 mole percent of a water soluble anionic monomer. These copolymers may be referred to as polyampholytes. In a preferred embodiment, the anionic monomer is at least one of acrylic acid and methacrylic acid, which is sometimes denoted as (meth) acrylic acid. The polymers may have an Intrinsic Viscosity of at least 0.3, as measured in 1 M $NaNO_3$ at 30° C. The amount of water soluble anionic monomer polymerized with DADMAC may vary from as little as about 5 mole percent to as much as about 30 mole percent. While methacrylic and most preferably acrylic acid are preferred monomers for copolymerization with DADMAC, other anionic vinyl monomers may be employed. Examples of such monomers are maleic acid, itaconic acid and fumaric acid. Furthermore, diluent monomers may be ter-polymerized with the DADMAC and the water soluble anionic monomer, and may be used in amounts of up to about 10 mole percent. Preferred diluent monomers are the hydroxy $C_2$-$C_6$ alkyl acrylates and/or methacrylates. Other diluent monomers that may be utilized include, but are not limited to, acrylonitrile, acrylamide, styrene, vinyl acetate, and the like. The polymer containing the diluent monomers are attractive from the standpoint that most of the diluent monomers are inexpensive and in most cases do not materially detract from the activity of the DADMAC copolymer into which they have been incorporated. The co- and terpolymers of DADMAC as generally described above are illustrated in great detail in U.S. Pat. No. 4,715,962, the disclosure of which is incorporated herein by reference in its entirety. The polymer may be in the form of an aqueous solution or in the form of a water-in-oil emulsion, which in the presence of certain water soluble surfactant(s) invert into water and allow the polymer contained in the emulsion to dissolve rapidly. The dosage of the DADMAC polymer may be at least about 25 parts per million of polymer (i.e., grams of polymer per metric ton of metal-bearing material treated), preferably from about 50 parts per million to about 2,000 parts per million. The DADMAC polymer, including copolymer and terpolymer, may be in the form of an aqueous solution wherein the polymer content in the aqueous solution is from about 10 percent to about 50 percent by weight of the aqueous solution.

In certain embodiments, the surfactant composition includes a surfactant compound and a high terpene-containing natural oil, such as described in U.S. Pat. Nos. 5,330,671; 5,527,482; 5,863,456; 5,876,622; 5,958,287; and 6,124,366, each of which is incorporated herein by reference in its entirety. Surfactant compositions including a surfactant compound and a high terpene-containing natural oil are marketed as part of DUSTFOAM suppression systems by Enviroflo Engineering, an Ecolab Company. High terpene-containing natural oils are those natural oils having a terpene content of at least about 50%. The high terpene-containing natural oil may contain at least about 90% terpene. Suitable high terpene-containing natural oils include, but are not limited to, citrus peel oil, which includes, but is not limited to, orange peel oil (i.e., orange oil), grapefruit peel oil (i.e., grapefruit oil), and lemon peel oil (i.e., lemon oil). Orange peel oil is preferred in certain embodiments, as it contains from about 90% to about 94% terpene and is very abundant in certain parts of the world. Pine oil is also a useful high terpene-containing natural oil.

The surfactant composition may include from about 1% to about 15% by weight high terpene-containing natural oil, preferably from about 8 to about 12% by weight, and more preferably from about 8 to about 10% by weight. The amount of high terpene-containing natural oil will depend upon the amount of terpene in the high terpene-containing natural oil. For example, in the case of orange peel oil, the orange peel oil can be present in the surfactant composition in an amount of from about 1 to about 15% by weight, or from about 8% to about 10% by weight. The terpene may break up oily (fatty) deposits on ore particles allowing the leaching agent(s) to better contact the ore particles. Conventional surfactants can be used in combination with the high terpene-containing natural oil, such as at least one of an anionic surfactant and a nonionic surfactant. Preferred is an anionic surfactant such as a salt of a fatty acid, an alkyl sulfate, an alkyl ether sulfonate, an alkyl aryl sulfonate, multiples thereof, and combinations thereof. Examples of preferred surfactants include sodium dodecylbenzene sulfonate, sodium lauryl ether sulfate and salts such as a sodium salt of a secondary alkane sulfonate (e.g., Hostaspun SAS 60 marketed by Hoechst). Furthermore, the use of ethoxylated nonylphenols with, e.g., from about 8 to about 10 moles of ethylene oxide and/or ethoxylated octylphenols with, e.g., from about 8 to about 10 moles of ethylene oxide (e.g., alkylaryl polyglycol ether N9), may be utilized as well. In certain embodiments, the surfactant composition contains up to about 40% by weight surfactant(s), preferably from about 15% to about 25% by weight surfactant(s), and more preferably from about 20% to about 22% by weight.

The surfactant composition may further comprise a variety of additives such as, for example, an antioxidant and/or a preservative. An example of a suitable antioxidant is butylated hydroxytoluene (i.e., 2,6-di-tert-butyl-para-cresol; "BHT"). The antioxidant may be present in the composition in an amount of from about 0.01% to about 1% by weight, preferably from about 0.08% to about 0.12% by weight. Suitable preservatives include, but are not limited to, formaldehyde, methylparaben, propylparaben, borax, and combinations thereof. The preservative may be present in the composition in an amount of from about 0.5% to about 5% by weight, preferably from about 0.8% to about 1.2% by weight.

When in an aqueous composition, water may make up the majority of the surfactant composition. Generally, when in an aqueous composition, the surfactant composition may comprise from about 60% to about 80% by weight water, including from about 60%, or from about 63%, or from about 66%, to about 80%, or to about 75%, or to about 70% by weight water. The water may be derived from fresh water, sea water, brine, mixtures of water and non-toxic water soluble organic compounds, recycled process water, and combinations thereof.

An example of an effective surfactant composition comprises about 11% sodium dodecyl benzene sulfonate, about 5% sodium lauryl ether sulfate, about 9% cold pressed orange peel oil, about 3% alkyl aryl polyglycolether N9, about 1% of a sodium salt of a secondary alkane sulfonate, about 1% formaldehyde, and about 0.1% of an antioxidant; with the balance being water (all percentages are by weight). A further example of an effective surfactant composition comprises 10.95% (i.e., about 11%) sodium dodecyl benzene sulfonate, 5.1% (i.e., about 5%) sodium lauryl ether sulfate, 9.1% (i.e., about 9%) cold pressed orange oil, 3.5% (i.e., about 3%) alkyl aryl polyglycolether N9, 1.4% (i.e., about 1%) of a sodium salt of a secondary alkane sulfonate, 1% formaldehyde, and 0.1% of an antioxidant. In certain embodiments, the balance is water (all percentages are by weight).

Another example of an effective surfactant composition comprises from about 15% to about 20% (e.g., about 17%) $C_{14-16}$ alpha olefin sulfonate, from about 0.1% to about 3% (e.g., about 1%) orange peel oil, from about 0.1% to about 2% (e.g., about 0.6%) cocodiethanolamide, and from about 0.01% to about 1% (e.g., about 0.1%) antioxidant. In certain embodiments, the balance is water (all percentages are by weight).

The surfactant composition may be dosed to the metal-bearing material in an amount of from about 1 part per million (ppm) to about 10,000 ppm, including from about 1 ppm, or from about 5 ppm, or from about 10 ppm, or from about 15 ppm, or from about 20 ppm, to about 10,000 ppm, or to about 1,000 ppm, or to about 500 ppm, or to about 100 ppm, or to about 50 ppm, or to about 40 ppm. In a preferred embodiment, the surfactant composition is dosed to the metal-bearing material in an amount of from about 20 ppm to about 40 ppm. Referring to the dosage of the surfactant composition, the term "part(s) per million" (i.e., "ppm") refers to grams of surfactant per metric ton of metal-bearing material (e.g., ore) treated. The surfactant composition may be dosed to the metal-bearing material in an amount of about 1 ppm or greater, or about 5 ppm or greater, or about 10 ppm or greater, or about 15 ppm or greater, or about 20 ppm or greater, or about 25 ppm or greater, or about 30 ppm or greater, or about 35 ppm or greater, or about 40 ppm or greater, or about 45 ppm or greater, or about 50 ppm or greater. Dosages are based upon total surfactant composition in the metal-bearing material.

The disclosed methods may be used with any type of leaching composition suitable for extraction processes. The leaching composition is combined at some point during the surfactant exposure to extract metal from the metal-bearing material, wherein leaching efficiency may be enhanced due to less surface tension created by activity of the surfactant composition. Leaching compositions include at least one leaching agent, e.g., an acid, a base, or a salt. It is to be understood that one or more leaching agents may be used in combination. The leaching composition may further include an additive, which may be a solvent.

In certain embodiments, the leaching agent is an acid, which may be a weak acid, a strong acid, or a combination of several acids. Suitable acids include, but are not limited to, nitric acid, hydrofluoric acid, hydrochloric acid, sulfuric acid, phosphoric acid, perchloric acid, and combinations thereof. In certain embodiments, the leaching agent is a base, or a combination of several bases. Suitable bases include, but are not limited to, a carbonate (e.g., at least one of sodium bicarbonate, ammonium carbonate, and dissolved carbon dioxide), a hydroxide base (e.g., at least one of sodium hydroxide, potassium hydroxide, and ammonium hydroxide), gaseous ammonia, and combinations thereof. In certain embodiments, the leaching agent is a salt. Suitable salts include, but are not limited to, a cyanide (e.g., at least one of sodium cyanide, potassium cyanide, and calcium cyanide), ferric sulfate, ferric chloride, cupric chloride, ferrous chloride, and combinations thereof. In certain embodiments, the leaching agent is ozone. In certain embodiments, the leaching agent is a thiosulfate (e.g., sodium thiosulfate), thiourea, thiosulfuric acid, and combinations thereof. In certain embodiments, the leaching agent is at least one of a dithiooxamide (e.g., rubeanic acid) and a substituted dithiooxamide. In certain embodiments, the leaching agent is a halogen-containing compound. In a preferred embodiment, the leaching agent is selected from the group consisting of: an acid, a cyanide, and combinations thereof.

Suitable additives that may be utilized in the leaching composition include, but are not limited to, an oxidant and a chelating agent.

A chelating agent may be utilized to sequester a desired metal for metal recovery. In certain embodiments, a chelating agent is added to sequester a metal material that may interfere with leaching and recovery of one or more desired metals. For example, a chelating agent may be added to sequester calcium, magnesium, or other alkaline earth metal ions in an aqueous phase of a metal-bearing slurry. The addition of a chelating agent has been found to improve, for example, gold recovery in some ores. It is believed that chelating agents may control precipitation of insoluble salts and retard blocking of pores present in ore particles by the insoluble salts. Sequestering the alkaline earth metal ions is believed to promote good contact between the leaching agent and the desired metal (e.g., gold) of the ore particles. For example, the use of ethylene diamine tetraacetic acid, or salts thereof (either or both referred to herein as "EDTA") as a chelating agent has been found to improve gold recovery in some ores by about 5% to about 10% compared to ore slurries without a chelating agent. Examples of chelating or sequestering agents which may be used include, but are not limited to, ethylenediaminetetraacetic acid, nitrilotriacetic acid, diethylenetriaminepentacetic acid, methanediphosphonic acid, dimethylaminomethane-1,1 diphosphonic acid, aminotrimethylenetriphosphonic acid, sodium hexametaphosphate, 1-hydroxyethane-1,1 diphosphonic acid, and salts thereof. The amount of chelating agent added may vary depending on, for example, compositional makeup of the metal-bearing material. A chelating agent may be added in an amount of from about 0.04 to about 2 pounds of chelating agent per ton of metal-bearing material (e.g., ore), or from about 0.8 to about 1.4 pounds of chelating agent per ton of metal-bearing material.

Suitable solvents for inclusion in the leaching composition include, but are not limited to, water. Any suitable source of water for the aqueous leaching compositions may be used. For example, the water may be derived from fresh water, sea water, brine, mixtures of water and non-toxic water soluble organic compounds, recycled process water, or any combination thereof.

In certain embodiments, the leaching composition may be an aqueous solution comprising at least one leaching agent, and optionally one or more additives. In certain embodiments, the leaching composition may be an aqueous solution including cyanide (e.g., from NaCN, KCN, and/or Ca(CN)$_2$). In certain embodiments, the leaching composition may be an aqueous solution including thiosulfate (e.g., from sodium thiosulfate). In certain embodiments, the leaching composition is an aqueous halogen-containing solution. The aqueous halogen-containing solution may include one or more oxidizing agents. Suitable oxidizing agents include those having a standard oxidation-reduction potential of over +900 mV, such as nitric acid, hydrogen peroxide, and chlorine. Such leaching compositions may be suitable for recovering of gold from ore materials.

The leaching compositions may be applied to the metal-bearing material in an amount sufficient to leach at least a portion of the metal contained in the metal-bearing material, depending on several factors including, but not limited to, the amount of metal-bearing material, the surface area of the metal-bearing material, the concentration of metal in the metal-bearing material, the concentration of leaching composition, the equipment available to perform the leaching, and so forth. A person of skill in the art is able to determine the sufficient amount of leaching composition without undue experimentation.

Exemplary leaching agents/compositions are provided in Table 1.

TABLE 1

Leaching Agents/Compositions

| Category | Leaching Agent | Application |
| --- | --- | --- |
| Acids | Diluted $H_2SO_4$ | Copper oxides, zinc oxide, lateritic nickel |
| | Diluted $H_2SO_4$ with oxidant | Cu-, Ni-, and Zn-sulfides, oxidized uranium ore |
| | Concentrated $H_2SO_4$ | Sulfided copper concentrate, laterites |
| | Nitric Acid | Cu-, Ni-, and Mo-sulfides, uranium concentrates, zirconium oxide |
| | Hydrofluoric acid | Columbite-tantalite ore |
| | Hydrochloric acid | Titanium ores, nickel matte, reduced cassiterite |
| Bases | Sodium hydroxide | Bauxite |
| | Sodium carbonate | Uranium oxide, scheelite |
| | Ammonium hydroxide | Nickel, sulfide, copper sulfide, reduced laterite |
| Salts | Ferric sulfate/chloride | Concentrates of base metal sulfides |
| | Cupric chloride | Concentrates of base metal sulfides |
| | Cyanide salt (e.g., sodium cyanide, potassium cyanide, and/or calcium cyanide) | Gold and silver ores |
| | Ferrous chloride | Nickel sulfide |
| Water | Water | Sulfides and chlorides, sodium vanadate, sodium molybdate, sodium tungstanate |

In a preferred embodiment, gold and/or silver is leached from ore that contains gold and/or silver using a cyanide salt. The cyanide salt is dissolved in an aqueous alkaline or neutral solution, which may be utilized as the leaching agent.

The disclosed methods may be used with any type of metal-bearing material, such as an ore material, a concentrate, a precipitate, or any other metal-bearing material from which a metal value may be recovered. The metal-bearing material may be an oxide ore, a sulfide ore, or a combination of oxide and sulfide ores. The minerals in the ore material may include a range of oxides, hydroxides, and sulfides. Metals that may be extracted from the metal-bearing materials include, but are not limited to, gold, silver, platinum, rhodium, iridium, osmium, palladium, aluminum, indium, gallium, tellurium, mercury, bismuth, cadmium, lead, zinc, copper, nickel, cobalt, molybdenum, rhenium, ruthenium, germanium, beryllium, iron, uranium, yttrium, titanium, lanthanum, cerium, praseodymium, neodymium, promethium, samarium, europium, gadolinium, terbium, dysprosium, holmium, erbium, thulium, ytterbium, lutetium, and combinations thereof. In a preferred embodiment, the metals that are being extracted from the metal-bearing materials comprise at least one of gold, silver and copper.

The disclosed methods may be used with any type of extractive metallurgy. Extractive metallurgy includes the process of extracting metals from metal-bearing materials (e.g., mineral ores) by physical and/or chemical methods. Extractive metallurgy includes hydrometallurgy, pyrometallurgy, and electrometallurgy. Hydrometallurgy is the technique of extracting metals by aqueous physicochemical processes; pyrometallurgy involves dry physicochemical processes at elevated temperatures; and electrometallurgy deals with electrolytic methods. Electrometallurgy may be integrated with the other two processes, with electrolysis in aqueous media being used in hydrometallurgy, and electrolysis in smelted media being used in pyrometallurgy.

Extractive metallurgy processes may include operations to affect metal concentration and/or separation. For example, extractive metallurgy may include comminution methods (e.g., crushing or milling), physical concentration methods (e.g., magnetic, gravity, and electrostatic separation), physicochemical concentration methods (e.g., flotation), and solid-liquid separation methods (e.g., filtration systems, counter-current decantation (CCD) circuits, thickeners, centrifuges, and the like).

Hydrometallurgy is generally carried out in three distinct, sequential physicochemical stages: (a) selective dissolution of metals contained in the solid phase (e.g., leaching); (b) purification and/or concentration of the aqueous solutions containing the target metals (e.g., precipitation, cementation, ionic exchange, or solvent extraction); and (c) selective recovery of metals (e.g., electrowinning, electrorefining, or hydrogen reduction).

Leaching of metal-bearing materials can be accomplished by affecting contact between a metal-bearing material and a leaching composition. The pregnant solution resulting from the leaching process can contain dissolved metals (for example, indium, silver, gold, copper, zinc, lead, gallium, the like, or a combination thereof), residual leaching agents, and/or other materials. The soluble ions or metallic complexes in the pregnant solution can be selectively extracted from the pregnant leaching solution in downstream purification/extraction stages. Such purification/extraction stages may include, for example, solvent extraction, filtering, centrifuging, electrolysis, electrowinning, precipitation, ion exchange, and/or flotation.

Leaching conditions may depend on the metal-bearing material to be leached and the selected leaching composition. Leaching can take place under ambient conditions, or at elevated temperatures and/or under elevated pressure. For example, the temperature may range from ambient (e.g., 10° C.) to 200° C.; the pressure may range from atmospheric pressure (e.g., 14.7 psi) to 750 psi. The time for extraction may vary from days to months to years depending on the particle size, mineralogy, rate of extraction, economics of continuing leaching, or a combination thereof. Leaching may include different leaching cycles (e.g., batch, continuous, or intermittent multiple-batch); direction of flows (e.g., co-current, counter-current, or hybrid); stages (e.g., single-stage, multiple-stage, or differential-stage); and contact methods (e.g., percolation or dispersed solids).

The actual mechanism of leaching may involve simple dissolution made possible by administration of a suitable solvent, or may involve dissolution made possible by a chemical reaction. The efficiency and rate of leaching may depend upon many factors, including the rate at which the leach solution is administered, the amount of metal in the metal-bearing material, and the conduciveness of the metal-bearing material to leaching.

Leaching processes that may be used for recovery of metal values from metal-bearing materials generally include in-situ leaching, dump leaching, heap leaching, vat leaching, agitated leaching, or a combination thereof. Selection of the type of leaching process to be employed may be based on several factors, such as for example, the grade of an ore material, the clay content of an ore material, the hardness of an ore material, or the way an ore material responds to various leaching methods. A dump or heap leach system may provide reduced capital (equipment) costs and operating (energy) expense, and therefore may be selected for use with lower grade ore materials, or with higher grade ore materials that respond well to heap leaching, permitting a high metal recovery. Agitation leaching, on the other hand, may provide for a faster and more complete recovery of a desired metal(s), may be easier to control, and may give higher recovery of secondary valuable metals, such as cobalt. Agitated leaching may require the capital cost of additional equipment, such as mills, leach tanks and clarifiers, and may have a higher operating cost because of, for example, the energy required to mill the metal-bearing material and the chemicals needed for solids-liquid separation(s).

In-situ leaching includes applying a leaching solution directly on the place where an ore is located within a mineral deposit itself. The pregnant leach solution may then be pulled up and sent for subsequent purification/extraction stages.

Dump leaching includes piling up a metal-bearing material and applying a leaching solution to the top of the dump from where it percolates by gravity, being collected at the bottom of the dump. Dump leaching may be used for run of mine ("ROM") materials. Dump leaching may be preferred for leaching of very low grades of target metal, usually below the economic cut-off grade for the main processing line, known as mineralized waste.

Heap leaching includes crushing a metal-bearing material, piling up the crushed material, and applying a leaching solution to the top of the heap from where it percolates by gravity, being collected at the bottom of the heap. A heap may be at least 10 feet high, at least 30 or more feet high, at least 100 feet or more in width, and up to about 2,600 feet in length, on a commercial scale. The crushed metal-bearing material may optionally be agglomerated (e.g., with concentrated sulfuric acid) prior to leaching to achieve a uniform particle size, which may improve uniform percolation of the leaching solution. In the heap leaching process, heaps can be either dynamic or permanent. In the case of dynamic heaps, also called on-off heaps, the ore after being leached may be moved to a location for final disposal of tailings and the base of the heap may be re-used. In the case of permanent heaps, or static heaps, new heaps may be formed on top of previous ones, either using or not the existing impermeabilized area.

Application and distribution of the leaching solution to a dump or heap may be performed at the top of the dump or heap by, for example, drippers or wobbler-type sprinklers. The treatment fluids may percolate or seep through the heap. The typical application rate of a leaching composition is about 0.005 gallons of fluid per minute per square foot of the heap's top surface. The percolation generally may be unassisted gravitational flow, and thus the flow rate may be determined primarily by the application rate and the permeability of the heap. In general the flow rate of percolation through the heap can vary from about 0.001 to about 0.01 gallons of fluid per minute per square foot (of a horizontal plane). When the fluids reach the impermeabilized area at the bottom of the dump or heap, they may drain or run off to the side to a pond or reservoir. The impermeabilized area may be formed of, for example, polyethylene or compacted clay. The pregnant solution containing the target metal and exiting the dump or heap may be sent for subsequent purification/extraction stages for metal recovery. The leached ore may be washed in order to recover retained leach solution containing dissolved metals and residual reagents such as acid.

Vat leaching (in static tanks) includes a set of usually square cross-sectioned tanks, where a crushed metal-bearing material (e.g., a crushed ore) is loaded and a leaching solution is applied so as to flow either upwardly or downwardly, thereby inundating the layer of crushed material. The flow of leaching solution may be laminar. The leaching cycle may be 6 to 12 days.

Agitated leaching includes dispersing an aqueous slurry of crushed and milled metal-bearing materials in one or more stirred tanks. The combination of a liquid with the metal-bearing material to form a slurry can be accomplished using any one or more of a variety of techniques and apparatus, such as, for example, in-line blending or using a mixing tank or other suitable vessel. The slurry may have a concentration of solid metal-bearing material (the slurry density) on the order of less than about fifty (50) percent by weight of the stream, and preferably about forty (40) percent by weight of the stream. Other slurry densities that are suitable for transport and subsequent processing may, however, be used. The slurry of metal-bearing material may be dispersed into the leaching solution by, for example, gas injection or mechanical agitation.

Agitated leaching may be conducted at atmospheric pressure, increased pressure, or a combination thereof. Crushed metal-bearing material that is to be agitation-leached may be ground or wet-milled to a desired size distribution for achieving an acceptable metal recovery in leaching, with the resulting metal-bearing solids being added to the agitation leach unit(s) as an aqueous slurry. The material may be ground to 100%—65 Tyler mesh, or 100% Tyler mesh. The solids content of the slurry may be between 35% and 55%, or between 40% and 50% by weight. The aqueous portion of the slurry may be derived from, for example, fresh water, sea water, brine, mixtures of water and non-toxic water soluble organic compounds, recycled process water, or any combination thereof. Thus, in agitation leaching, a considerable amount of water may be normally brought into the leaching system with the metal-bearing material. This water may eventually leave or be removed from the system in order to maintain a water balance. Water may be removed from the system with the leached solids in the tailings, or by intermittent bleeds from the circuit. At the conclusion of agitated tank leaching, the leached solids can be separated and washed using, for example, counter-current thickening and washing, filtration, or a combination thereof. Any desired metal or other valuable metals in the water leaving with the leached solids may be lost (called the "soluble metal loss"). Leaching agent in this water may also lost and may be neutralized prior to the final disposal of the leached solids. In comparison with other methods, leaching time in agitated leaching may be smaller due to smaller particle size (greater specific area) and due to the turbulence in the tank, which provides higher diffusion between reagent and metal-bearing material.

Hydrometallurgical extractive processes may be sensitive to particle size. Some metal-bearing materials are quite permeable to leach compositions; hence, relatively large particles of the material can be effectively leached. Many metal-bearing materials are, however, rather impermeable. If the particles are too large, a leach composition may not penetrate to the interior of the particles, and leaching may be incomplete. Further, use of large particles may result in a percolation rate too rapid for effective heap or dump leaching. Materials may therefore be reduced in size before leaching in order to increase the surface area of the material being treated and to decrease the requirement for the leach composition to penetrate deeply into the particles. On the other hand, if the particles are too small, although the metal-bearing material may be effectively penetrated by the leach solution, the percolation rate may become so slow as to be impractical. Undersized particles may therefore be "agglomerated," such as by the addition of a cement.

The metal-bearing materials subjected to leaching may be reduced to a particle size in the extraction processes as appropriate. Various broad particle size ranges may be engineered in order to use heap or dump leaching, vat leaching, agitated leaching, or a combination thereof. For example, heap or dump leaching may be performed using material crushed to a P80 (product size is 80% passing the nominal size listed) of about ⅛ inch to greater than about 1 inch. Agitated leaching may be performed at a size of less than about 500 μm (about 0.5 mm). In various embodiments, it may be desirable to have a finer size than about 500 μm to reduce any potential problems with abrasion. In various embodiments, agitated leaching may be performed at a size of about 50 In various other embodiments, vat leaching may be performed using material crushed (and optionally ground for the finer size range) to a P80 of about 0.2 inch (about 0.5 mm) to greater than about 1 inch.

A variety of acceptable techniques and devices for reducing particle size of the metal-bearing material may be used. Suitable devices include, but are not limited to, ball mills, tower mills, superfine grinding mills, attrition mills, stirred mills, or any combination thereof. Controlled fine grinding may be achieved using a fine grinding apparatus, such as, for example, a stirred horizontal shaft mill with baffles or a vertically stirred mill without baffles. If a horizontal mill is utilized, any grinding medium that enables the desired particle size distribution to be achieved may be used, the type and size of which may be dependent upon the application chosen, the product size desired, grinding apparatus manufacturer's specifications, and the like. Exemplary media include, for example, sand, silica, metal beads, ceramic beads, and ceramic balls.

In various embodiments, crushing of metal-bearing materials may be conducted without water addition. However, in other embodiments, optionally "water-flush" crushing may be used to elutriate the fine materials formed during the crushing operation, or a combination of dry crushing and "water-flush" crushing. In various embodiments, grinding can be conducted with water addition. Water addition for grinding may be obtained, for example, from available fresh water, brackish water, recycle neutral chloride-containing solutions or any other source.

Particles of metal-bearing material by undergo size classification. Cyclone technology (e.g., use of cyclones, or mini-cyclones) may be utilized to facilitate size classification of relatively coarse materials from relatively fine materials. An optional solid-liquid separation stage may be utilized to remove excess processing liquid where the chosen grinding method and apparatus utilize a liquid processing agent (such as, for example, process water) to facilitate grinding (e.g., in a super-fine grinding stage).

In certain embodiments, the metal-bearing materials may be agglomerated to increase particle size for leaching. Crushed metal-bearing material may be sent to an agglomeration unit by, for example, a conveyor belt. If necessary, water may be added to the crushed product during transport, for example in cases in which a metal-bearing material is very dry and contains a high amount of fines. Addition of water onto the conveyor belt may be performed in several ways, such as spraying, and may minimize dust formation, thereby rendering more favorable working conditions. The crushed material may then be sprayed with an aqueous solution containing an agglomeration aid, and tumbled. The amount of water applied to the material during this spraying may generally be from about 2, or 3, percent to about 10 or 12 percent, based on the weight of the material (e.g., ore as mined contains about 3 to about 10 percent water, the balance being solids that would remain upon oven drying). An agglomeration aid may be dissolved in that water at a concentration to provide an amount of agglomeration aid in the metal-bearing material that is effective to provide the permeability desired. During or shortly after the spraying of an agglomeration aid solution, mechanical agitation of the materials may be required to distribute the agglomeration aid through the materials. Such mechanical agitation may be provided by tumbling (e.g., tumbling with an aqueous solution of agglomeration aid may be done in a rotary drum agglomerator or pug mill, or the metal-bearing material can be treated and tumbled by mechanical action of a conveyor belt transfer point, or the cascading of material as a heap is formed). The tumbling action may be provided for a very short time period, and generally that time period is less than a minute.

An aqueous leach composition containing the leached metal (also referred to as a "pregnant solution") can then be directed to further extraction and purification processes to recovery a selected metal value. The pregnant solution from a leach process may undergo purification/extraction stages as appropriate to recover the desired metal value(s). Suitable processes include, but are not limited to, metal recovery through precipitation, cyclonic separation, thickening and filtering, electrowinning, electrolysis, solvent extraction, activated carbon adsorption, ion exchange resin adsorption, recycling of leaching solution, or any combination thereof. Activated carbon or ion exchange resins may be separated from a leach residue by screening, for example.

Solvent extraction can be carried out in any known manner. Pregnant solution may be contacted with an organic phase containing a metal-specific extraction reagent. The metal-specific extraction reagent may extract the metal from the aqueous phase into the non-aqueous phase. Each extraction performed can be carried out by mixing an organic phase and a pregnant solution and allowing the two phases to settle. This mixing-settling can be carried out in multiple series of mixing-settling tanks with countercurrent flow of the aqueous and non-aqueous phases. Solvent extractions may be carried out using mixer-settler solvent extraction units, wherein the organic phase and the aqueous leach solution are vigorously intermixed in a mixer, and the resulting dispersion of organic and aqueous is then passed to a settler where the two phases settle, and from which there exits a clear organic phase and a clear aqueous phase. A solvent extraction process may include, for example, 2 extraction stages and 2 strip stages or 2 extraction stages and 1 strip stage. Another example is 1 extraction stage followed by 2 extraction stages and 1 strip stage in what is called the series parallel stage configuration. In the series parallel staging configuration, the high grade leach solution may be treated in the 2 extraction stages and the low grade leach solution in the single extraction stage. In some cases wash stages may also be employed. After solvent extraction, the pregnant solution, now depleted in metal, may be recycled back to a leaching process. The leach solution depleted in metal that exits the solvent extraction process may be called a raffinate. The solvent extraction process may recover some 80 to 95% of the metal in the leach solution. Thus, the raffinate may contain about 5-20% of the leached metal. The raffinate may be recycled back to the leach process and provide the bulk of a leach solution used in a leaching process.

Efficiency of the metal recovery may be enhanced, at least in part, by minimizing the losses of soluble metal in the remaining solid materials (e.g., pulp materials), which constitutes the waste. The leached solids from a leach process may be treated with chemical or physical processes or a combination of chemical or physical processes in order to render the materials acceptable for environmental disposal. The leaching process may also be applied to a concentrate that is recovered from the ore using physical or chemical concentration methods or a combination of chemical or physical methods.

The foregoing may be better understood by reference to the following example, which is presented for the purpose of illustration and is not intended to limit the scope of the invention.

EXAMPLE

A gold containing ore was treated with 20 ppm and 40 ppm of a surfactant composition comprises 17.3% (i.e., about 17%) sodium dodecyl benzene sulfonate; 1.0% (i.e., about 1%) cold pressed orange peel oil; 0.6% (i.e., about 0.6%) of cocodiethanolamide; and 0.13% antioxidant; with the balance being water (all percentages are by weight) and the amount of gold extracted was measured and compared to an untreated sample. Surfactant blend product was added to a gold containing ore treated with cyanide and evaluated using a standard bottle roll test. Bottle roll tests were conducted with varied doses from at 0 ppm, 20 ppm, and 40 ppm. As shown in Table 2, the amount of gold extracted in the treated samples was higher when compared to the untreated samples. Although the test was conducted using a particular surfactant composition, other surfactants and/or polymers that reduce surface tension of the barren solution are expected to enhance leaching efficiency in a similar manner. The surfactants can be applied to metal-bearing materials containing, e.g., any high valuable metal such as, e.g., gold, silver, and copper.

TABLE 2

| Gold Extraction Calculated on Solids | |
| --- | --- |
| Surfactant Dosage | Average Leaching Efficiency |
| 0 ppm | 83.76% |
| 20 ppm | 84.26% |
| 40 ppm | 84.77% |

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of extracting metal from a metal-bearing ore, the method comprising:
   applying a surfactant composition comprising a high terpene-containing natural oil, and a leaching agent comprising an acid and/or a cyanide to the ore to form a treated ore;
   subjecting the treated ore to a leaching process selected from dump leaching, heap leaching, vat leaching, or agitated leaching; and
   recovering at least a portion of the metal, wherein the metal is at least one of gold, silver, and copper.

2. The method of claim 1, wherein the metal-bearing ore is comminuted prior to the applying.

3. The method of claim 1, wherein the surfactant composition comprises an anionic surfactant selected from the group consisting of: an alkyl awl sulfonate, an olefin sulfonate, a paraffin sulfonate, an alcohol sulfate, an alcohol ether sulfate, an alkyl carboxylate, an alkyl ether carboxylate, an ethoxylated alkyl phosphate ester, a monoalkyl sulfosuccinate, a dialkyl sulfosuccinate, a monoalkyl sulfosuccinamate, a dialkyl sulfosuccinamate, and combinations thereof.

4. The method of claim 1, wherein the surfactant composition comprises a cationic surfactant selected from the group consisting of: an alkyl trimethyl quaternary ammonium salt, an alkyl dimethyl benzyl quaternary ammonium salt, a dialkyl dimethyl quaternary ammonium salt, an imidazolinium salt, and combinations thereof.

5. The method of claim 1, wherein the surfactant composition comprises a nonionic surfactant selected from the group consisting of: an alcohol alkoxylate, an alkylphenol alkoxylate, a block copolymer of ethylene oxide, a block copolymer of propylene oxide, a block copolymer of butylene oxide, an alkyl dimethyl amine oxide, an alkyl-bis(2-hydroxyethyl)amine oxide, an alkyl amidopropyl dimethyl amine oxide, an alkylamidopropyl-bis(2-hydroxyethyl) amine oxide, an alkyl polyglucoside, a polyalkoxylated glyceride, a sorbitan ester, a polyalkoxylated sorbitan ester, an alkoyl polyethylene glycol ester, an alkoyl polyethylene glycol diester, and combinations thereof.

6. The method of claim 1, wherein the high terpene-containing natural oil is selected from the group consisting of: orange peel oil, grapefruit peel oil, lemon peel oil, pine oil, and combinations thereof.

7. The method of claim 1, wherein the surfactant composition is applied in an amount of about 1 gram of surfactant composition to about 10,000 grams of surfactant composition per metric ton of metal-bearing ore.

8. The method of claim 1, wherein the surfactant composition is applied in an amount of about 10 grams of surfactant composition to about 100 grams of surfactant composition per metric ton of metal-bearing ore.

9. The method of claim 8, wherein the leaching process is heap leaching.

10. The method of claim 1, wherein the leaching agent comprises: nitric acid, hydrofluoric acid, hydrochloric acid, sulfuric acid, phosphoric acid, perchloric acid, a carbonate, a hydroxide base, gaseous ammonia, a cyanide salt, ferric sulfate, ferric chloride, cupric chloride, ferrous chloride, ozone, a thiosulfate salt, thiourea, thiosulfuric acid, dithiooxamide, a substituted dithiooxamide, a halogen-containing compound, or a combination thereof.

11. The method of claim 1, wherein the leaching agent is at least one of sodium cyanide, potassium cyanide, and calcium cyanide.

12. The method of claim 1, wherein the surfactant composition comprises an amphoteric surfactant selected from the group consisting of: an alkyl amphoacetate, an alkyl amphodiacetate, an alkyl amphopropionate, an alkyl amphodipropionate, an alkyliminodiproprionate, and combinations thereof.

13. A method of improving leaching efficiency in a metal extraction process, the method comprising:
    applying a surfactant composition comprising a high terpene-containing natural oil to a metal-bearing ore; and
    subjecting the metal-bearing ore to a leaching process selected from dump leaching, heap leaching, vat leaching, or agitated leaching, wherein the metal is at least one of gold, silver, and copper.

14. The method of claim 13, wherein the metal-bearing ore is comminuted before or during the applying.

15. A slurry comprising:
    water;
    a metal-bearing ore comprising at least one of gold, silver, and copper;
    a surfactant composition comprising a high terpene-containing natural oil selected from the group consisting of: orange peel oil, grapefruit peel oil, lemon peel oil, pine oil, and combinations thereof; and
    a leaching agent comprising at least one of an acid and a cyanide
    wherein the slurry is disposed on a fixed bed.

16. The slurry of claim 15, wherein the high terpene-containing natural oil is orange peel oil.

17. The slurry of claim 15, wherein the surfactant composition comprises an anionic surfactant selected from the group consisting of: an alkyl aryl sulfonate, an olefin sulfonate, a paraffin sulfonate, an alcohol sulfate, an alcohol ether sulfate, an alkyl carboxylate, an alkyl ether carboxylate, an ethoxylated alkyl phosphate ester, a monoalkyl sulfosuccinate, a dialkyl sulfosuccinate, a monoalkyl sulfosuccinamate, a dialkyl sulfosuccinamate, and combinations thereof.

18. The slurry of claim 15, wherein the surfactant composition comprises a cationic surfactant selected from the group consisting of: an alkyl trimethyl quaternary ammonium salt, an alkyl dimethyl benzyl quaternary ammonium salt, a dialkyl dimethyl quaternary ammonium salt, an imidazolinium salt, and combinations thereof.

19. The slurry of claim 15, wherein the surfactant composition comprises a nonionic surfactant selected from the group consisting of: an alcohol alkoxylate, an alkylphenol alkoxylate, a block copolymer of ethylene oxide, a block copolymer of propylene oxide, a block copolymer of butylene oxide, an alkyl dimethyl amine oxide, an alkyl-bis(2-hydroxyethyl)amine oxide, an alkyl amidopropyl dimethyl amine oxide, an alkylamidopropyl-bis(2-hydroxyethyl) amine oxide, an alkyl polyglucoside, a polyalkoxylated glyceride, a sorbitan ester, a polyalkoxylated sorbitan ester, an alkoyl polyethylene glycol ester, an alkoyl polyethylene glycol diester, and combinations thereof.

* * * * *